United States Patent
Glinka-Hecquet et al.

(10) Patent No.: US 11,064,327 B2
(45) Date of Patent: Jul. 13, 2021

(54) METHOD FOR A SERVICE PROVIDER TO LAUNCH A TARGETED SERVICE IMPLEMENTED BY AN APPLICATION BELONGING TO A SECURITY DOMAIN OF AN EUICC

(71) Applicant: THALES DIS FRANCE SA, Meudon (FR)

(72) Inventors: Gerald Glinka-Hecquet, Meudon (FR); Denis Dubois, Meudon (FR)

(73) Assignee: THALES DIS FRANCE SA, Meudon (FR)

( * ) Notice: Subject to any disclaimer, the term of this patent is extended or adjusted under 35 U.S.C. 154(b) by 0 days.

(21) Appl. No.: 16/759,448

(22) PCT Filed: Oct. 16, 2018

(86) PCT No.: PCT/EP2018/078299
§ 371 (c)(1),
(2) Date: Apr. 27, 2020

(87) PCT Pub. No.: WO2019/091723
PCT Pub. Date: May 16, 2019

(65) Prior Publication Data
US 2020/0288290 A1 Sep. 10, 2020

(30) Foreign Application Priority Data
Nov. 9, 2017 (EP) ..................................... 17306557

(51) Int. Cl.
*H04W 4/00* (2018.01)
*H04W 4/60* (2018.01)
(Continued)

(52) U.S. Cl.
CPC ................ *H04W 4/60* (2018.02); *H04W 4/50* (2018.02); *H04W 4/70* (2018.02); *H04W 8/205* (2013.01);
(Continued)

(58) Field of Classification Search
CPC ......... H04W 4/60; H04W 8/18; H04W 8/183; H04W 8/186; H04W 8/20; H04W 8/205;
(Continued)

(56) References Cited

U.S. PATENT DOCUMENTS

| | | | |
|---|---|---|---|
| 2011/0016145 A1* | 1/2011 | De Lutiis | H04L 67/24 707/769 |
| 2015/0319152 A1* | 11/2015 | Chastain | H04W 4/60 726/4 |

(Continued)

FOREIGN PATENT DOCUMENTS

EP 3242407 A1 11/2017

OTHER PUBLICATIONS

PCT/EP20181078299, International Search Report, dated Jan. 4, 2019, European Patent Office, P.B. 5818 Patentlaan 2 NL—2280 HV Rijswijk.

(Continued)

*Primary Examiner* — Huy C Ho
(74) *Attorney, Agent, or Firm* — The Jansson Firm; Pehr B. Jansson

(57) ABSTRACT

Method for a service provider to launch a targeted service implemented by an application belonging to a security domain of an eUICC embedded into a communication device. The security domain and application being respectively called transversal security domain and transversal application, the eUICC comprising a set of at least one profile allowing the communication device to access to a specific mobile network infrastructure, one profile being (Continued)

activated at a time by receiving by the eUICC from an SM-SR server on a communication interface a command for enabling a profile, the command having an identifier of the transversal security domain; interpreting by the eUICC the command for enabling a profile as a command for transmitting a subscription address associated to the profile which is activated in the eUICC; sending an SMS message comprising a subscription address associated to the profile which is currently active; establishing between the server operated by the service provider and the eUICC a communication channel, this establishment being initiated by the server operated by the service provider using the subscription address transmitted by SMS; receiving by the eUICC on said communication channel a command for launching the targeted service; launching by the eUICC the targeted service.

20 Claims, 2 Drawing Sheets

(51) Int. Cl.
| | |
|---|---|
| *H04W 4/70* | (2018.01) |
| *H04W 4/50* | (2018.01) |
| *H04W 8/20* | (2009.01) |
| *H04W 8/24* | (2009.01) |
| *H04W 12/71* | (2021.01) |
| *H04W 12/72* | (2021.01) |
| *H04W 12/086* | (2021.01) |

(52) U.S. Cl.
CPC ......... *H04W 8/245* (2013.01); *H04W 12/086* (2021.01); *H04W 12/71* (2021.01); *H04W 12/72* (2021.01)

(58) Field of Classification Search
CPC ......... H04W 8/22; H04W 8/24; H04W 8/245; H04W 12/00514; H04W 12/0806; H04W 12/00512
USPC ............................................ 455/432.1, 432.3
See application file for complete search history.

(56) References Cited

U.S. PATENT DOCUMENTS

2015/0350916 A1    12/2015  Selander
2018/0070224 A1*    3/2018  Park ........................ H04W 8/20

OTHER PUBLICATIONS

PCT/EP2018/078299, Written Opinion of the International Searching Authority, dated Jan. 4, 2019, European Patent Office, D-80298 Munich.

Gsm Association: "Remote Provisioning architecture for Embedded UICC—Technical Specification—Version 3.1", May 27, 2016, XP055322069, Retrieved from the Internet: URL:http://www.gsma.com/newsroom/wp-content/uploads/SGP.02_v3.1.pdf [retrieved on Nov. 23, 2016] p. 43-51, p. 77-79, p. 249.

* cited by examiner

METHOD FOR A SERVICE PROVIDER TO LAUNCH A TARGETED SERVICE IMPLEMENTED BY AN APPLICATION BELONGING TO A SECURITY DOMAIN OF AN EUICC

TECHNICAL FIELD

The present invention relates to a method for a service provider to launch a targeted service implemented by an application belonging to a security domain of an eUICC. It is applicable to the technical domain aiming at providing connectivity for communication devices.

BACKGROUND OF THE INVENTION

The GSM association (GSMA) has provided in June 2017 the 3.2 version of an embedded SIM specification called "Remote Provisioning Architecture for Embedded UICC Technical Specification". This specification provides a de-facto standard mechanism for the remote provisioning and management of machine to machine (M2M) connections for the Internet of Things, allowing the "over the air" provisioning of an initial operator subscription, and the subsequent change of subscription from one operator to another.

In a M2M eSIM context, several profiles can be downloaded in an eUICC, each of them being associated with at least a different subscription address such as a Mobile Station International Subscriber Directory Numbers (MSISDN). As only one subscription profile can be activated at the same time, only the MSISDN that is associated to the activated subscription can be used to contact the IoT device embedded this eUICC.

The GSMA defines a profile as combination of a file structure, data and applications to be provisioned onto, or present on, an eUICC and which allows, when enabled, the access to a specific mobile network infrastructure.

An embedded Universal Integrated Circuit Card (eUICC) also called embedded SIM (eSIM) refers to a secure element designed to remotely manage multiple mobile network operator subscriptions. It is available in various form factors, either plugged-in or soldered and is manufactured by a eUICC manufacturer (EUM). A eUICC is therefore easy to integrate in any kind of device.

According to the Recommendation ITU-T Y.2060 provided by the International Telecommunication institute, the Internet of things (IoT) is defined as a global infrastructure for the information society, enabling advanced services by interconnecting physical and virtual things based on existing and evolving interoperable information and communication technologies. A thing is an object of the physical world (physical things) or the information world (virtual things), which is capable of being identified and integrated into communication networks. At present, IoT is generally applied in fields such as security surveillance, automatic vending machines, public traffic systems, vehicle monitoring and management, industry process automatization, motor machineries, city informationalization.

In this description, the expression IoT device refers to a piece of equipment with communication capabilities and optionally capacity of data capture, sensing, data storage, sensing and/or data processing. An IoT device comprises for example a wireless communication module also called Machine Type Communication (MTC) or Machine to Machine (M2M) module allowing transmission of data from one IoT device to another or exchange of data between machines through UMTS/HSDPA, CDMA/EVDO, LTE, 5G, LoRa or other networks.

According to the aforementioned GSMA specification, several profiles can be implemented on a given eUICC but only one of them can be activated at the same time. This means that the services provided by an application implemented in a non-activated profile cannot be used.

Gemalto (trademark) provides a solution for allowing applications implemented in a eUICC to be used whichever profile is active. For that purpose, a specific security domain different from the ones used for the profiles (ISD-P) hosts one or several applications providing one or several services. This type of application is called transversal application as it can be executed independently of the profile which is activated.

When a service provider associated to a transversal application implemented in a given eUICC embedded in an IoT device would like to remotely launch a service provided by said application, he uses data such as an MSISDN to establish a communication channel with the eUICC. However, data memorized by the service provider to establish this communication channel may not correspond to the profile which is currently active in the eUICC. In that case, the service provider will not be able to establish a communication channel with the eUICC and therefore, it will not be able to launch remotely a service provided by a transversal application implemented on this eUICC.

SUMMARY OF THE INVENTION

The invention relates to a method for a service provider to launch a targeted service implemented by an application belonging to a security domain of an eUICC embedded into a communication device, said security domain and application being respectively called transversal security domain and transversal application, the eUICC comprising a set of at least one profile allowing the communication device to access to a specific mobile network infrastructure, one profile being activated at a time, the method comprising the following steps:

receiving by the eUICC from an SM-SR server on a communication interface a command for enabling a profile, said command comprising an identifier of the transversal security domain;

interpreting by the eUICC thanks to the identifier of the transversal security domain the command for enabling a profile as a command for transmitting a subscription address associated to the profile which is activated in the eUICC;

sending by the eUICC to a server operated by the service provider an SMS message comprising a subscription address associated to the profile which is currently active;

establishing between the server operated by the service provider and the eUICC a communication channel, this establishment being initiated by the server operated by the service provider using the subscription address transmitted by SMS;

receiving by the eUICC on said communication channel a command for launching the targeted service;

launching by the eUICC the targeted service.

According to an example, the method also comprises the step of sending an ES5 failure notification to the server operated by the service provider after having interpreted the command for enabling a profile as a command for transmitting a subscription address.

According to an example, the subscription address is a Mobile Station ISDN (MSISDN).

According to an example, the subscription address is an International Mobile Subscriber Identity (IMSI).

According to an example, the subscription address is a SIP-URI.

The invention also relates to an eUICC configured to be embedded in a communication device and comprising at least a security domain and an application belonging to this security domain, said security domain and application being respectively called transversal security domain and transversal application, the eUICC being further configured for a service provider to launch remotely a targeted service implemented by the transversal application, the eUICC comprising a set of at least one profile allowing the communication device to access to a specific mobile network infrastructure, one profile being activated at a time. The eUICC is further configured to:

- receive from an SM-SR server on a communication interface a command for enabling a profile, said command comprising an identifier of the transversal security domain;
- interpret thanks to the identifier of the transversal security domain the command for enabling a profile as a command for transmitting a subscription address associated to the profile which is activated in the eUICC;
- send to a server operated by the service provider an SMS message comprising a subscription address associated to the profile which is currently active;
- establish with the server operated by the service provider a communication channel, this establishment being initiated by the server operated by the service provider using the subscription address transmitted by SMS;
- receive by the eUICC on said communication channel a command for launching the targeted service;
- launch the targeted service.

According to an example, the eUICC is further configured to send an ES5 failure notification to the server operated by the service provider after having interpreted the command for enabling a profile as a command for transmitting a subscription address.

According to an example, the subscription address is a Mobile Station ISDN (MSISDN).

According to an example, the subscription address is an International Mobile Subscriber Identity (IMSI).

According to an example, the subscription address is a SIP-URI.

The invention also relates to a computer program product comprising instructions which, when the program is executed by a computer, cause the computer to carry out the steps of the method described above.

The invention also relates to a data processing system comprising means for carrying out the steps of the method described above.

The invention also relates to a computer-readable storage medium comprising instructions which, when executed by a computer, cause the computer to carry out the steps of the method described above.

BRIEF DESCRIPTION OF THE DRAWINGS

Additional features and advantages of the invention will be more clearly understandable after reading a detailed description of one preferred embodiment of the invention, given as an indicative and non-limitative example, in conjunction with the following drawings.

DETAILED DESCRIPTION

Figure 1:
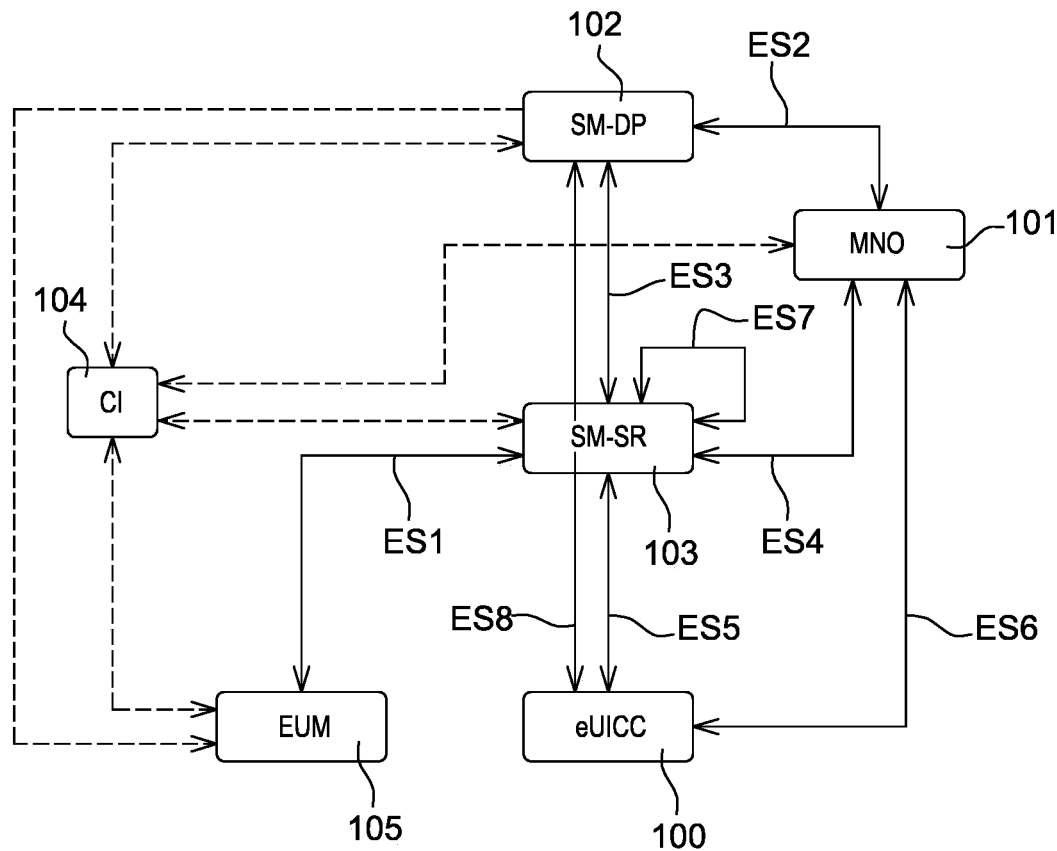
FIG. 1 illustrates schematically the architecture of an eUICC remote provisioning system.

FIG. 1 illustrates schematically the architecture of a eUICC remote provisioning system.

This architecture in provided in the GSMA specification "Remote Provisioning Architecture for Embedded UICC Technical Specification". An overview of the components of the system is provided hereafter. For a full description, one can refer to the aforementioned specification.

The eUICC remote provisioning system is comprises several components 100-105.

An eUICC 100 is represented and is able to communicate with the other components of the system using standard interfaces.

The SM-DP 102 is the "Subscription Manager-Data Preparation". Its role is to prepare the profiles and to manage the secure download and installation of these profiles onto the eUICC.

The SM-SR 103 is the "Subscription Manager-Secure Routing" server. Its role is to securely perform functions of Platform Management commands and the transport of Profile Management commands.

The CI entity 104 refers to the certificate issuer and the EUM 105 to the eUICC manufacturer. The MNO 101 refers to the Mobile network Operator.

These components are able to communicate using standard interfaces ES1-8. In particular, ES5, ES6 and ES8 interfaces allow the eUICC 100 to exchange data respectively with the SM-SR 103, the MNO 101 and the SM-DP 102.

According to an important aspect of the invention, the already existing interface ES5 is re-used in order to request the eUICC to transmit the MSISDN associated to its activated subscription profile.

In this description, an activated profile, also called enabled profile, refers to a profile having its files and/or applications selectable over the UICC-Terminal interface.

Figure 2:
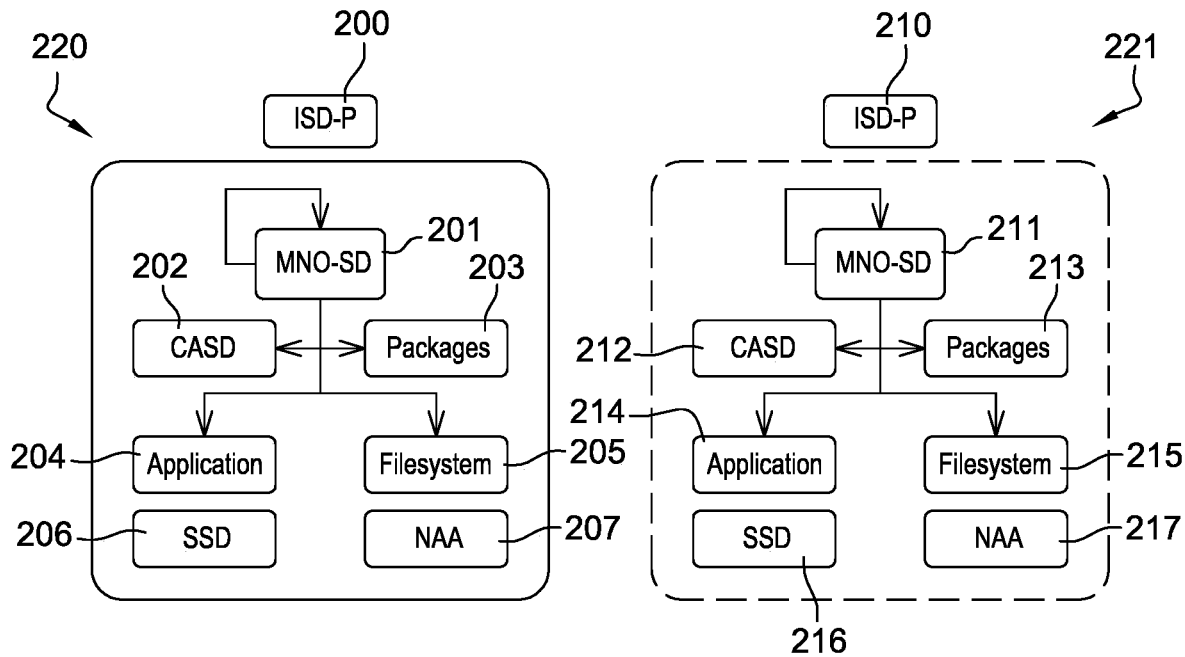
FIG. 2 is an example where two profiles installed on a given eUICC.

FIG. 2 is an example where two profiles are installed on a given eUICC.

Several profiles can be installed on the same eUICC. According to this example, two profiles 220, 221 are installed on a eUICC, therefore two Issuer Security Domain Profiles (ISD-P) 200, 210 are represented. As defined by the GSMA, an ISD-P is the representative of an off-card entity SM-DP.

Security domains divide the eUICC into independent private spaces. A service provider has its own security domain and maintains full control over it. No other service provider can access it or "eavesdrop" on its activities.

A subscription profile comprises a security domain MNO-SD 201, 211 owned by a given mobile network operator and providing a secured channel to said MNO's over-the-air (OTA) platform with the aim of managing the content of a profile once the Profile is enabled.

A profile also contains a Controlling Authority Security Domain (CASD) 202, 212 associated to one or several packages 203, 213. A profile can also comprise one or several applications 204, 214, a filesystem 205, 215, one or several supplementary security domains SSD 206, 216 and a Network Access Application (NAA) 207, 217.

When the profile 220 is activated (enabled), the other one 221 is deactivated (disabled) as only one profile can be activated at the same time. One of the consequences is that the applications 214 contained in the non-activated profile 210 cannot be executed. Only the applications 204 of the activated profile 200 can be executed.

Figure 3:
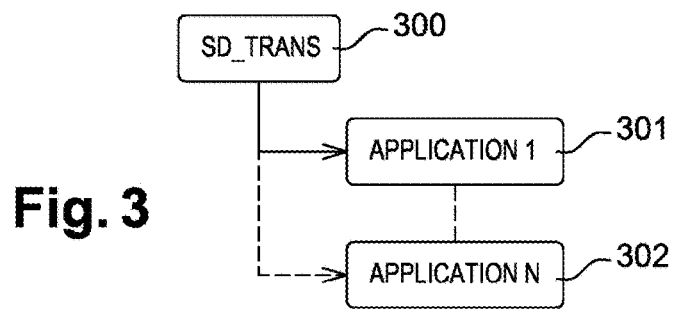
FIG. 3 illustrates an example in which transversal applications are implemented.

FIG. 3 illustrates an example in which transversal applications are implemented.

According to this example, a specific security domain 300 is installed in parallel with the one or several profiles installed on the eUICC such as those described in FIG. 2. This transversal security domain 300 is not associated to a profile allowing the access to a specific mobile network infrastructure. It comprises one or several applications 301-302 called transversal application provided one or several services. One crucial advantage of implementing a transversal security domain in parallel to the one which are associated to a profile is that when several standard profiles are implemented on a given eUICC, the one or several transversal applications of the transversal security domain can be executed whichever standard profile is activated.

The transversal security domain and its one or several transversal applications can be identified using an application identifier AID generally used for identifying an ISD-P (ISD-P-AID). Therefore, the use of the ISD-P AID is in that case diverted.

Figure 4:
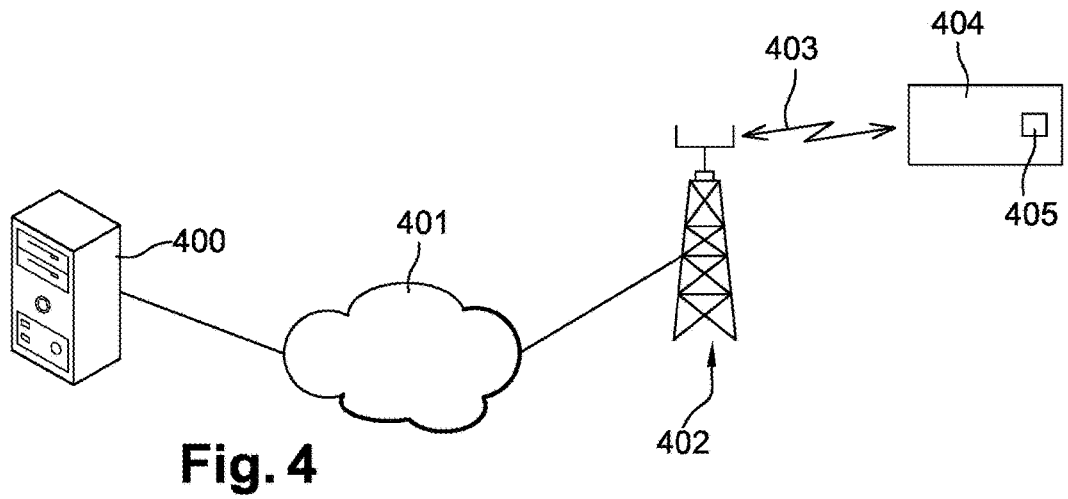
FIG. 4 is a simplified representation of a communication initiated by a service provider to execute a function of a transversal application installed on a given eUICC.

FIG. 4 is a simplified representation of a communication initiated by a service provider to execute a function of a transversal application installed on a given eUICC.

For example, the service provider wants a push notification handled by a traversal application implemented in the eUICC 405 of an IoT device 404 to be displayed on its screen. For that purpose, a server 400 belonging to the service provider will send a message comprising the content of the push notification to the IoT device 404. It is needed for the server to know a subscription address of the active profile.

The subscription address is a unique network address of a mobile Subscription within a mobile network, such as a Mobile Station ISDN (MSISDN), an International Mobile Subscriber Identity (IMSI) or a Uniform Resource Identifier (URI) for the Session Initiation Protocol (SIP) also referred as a SIP-URI. It is used to route messages, for example SMS, to the eUICC.

The notification is transmitted to the network 402 of a mobile network operator via one or several communication networks, for example via internet. Then, the mobile network 402 which is represented in a very simplified manner on FIG. 4 routes 403 the notification to the IoT device 404 and the notification is then processed by the appropriate transversal application installed in the eUICC 405.

However the service provider may be aware of a subscription address corresponding to a profile installed on the eUICC but which is not the active one. This can happen for example in case a given transversal application is set up and installed in the eUICC while a first profile is activated and when a second profile later becomes the active profile instead of the first one. In that case, the server of the service provider will be aware of subscription address of the first profile and will use it to communicate with a given transversal application installed on the eUICC. This will not work as the first profile is now deactivated.

Figure 5:
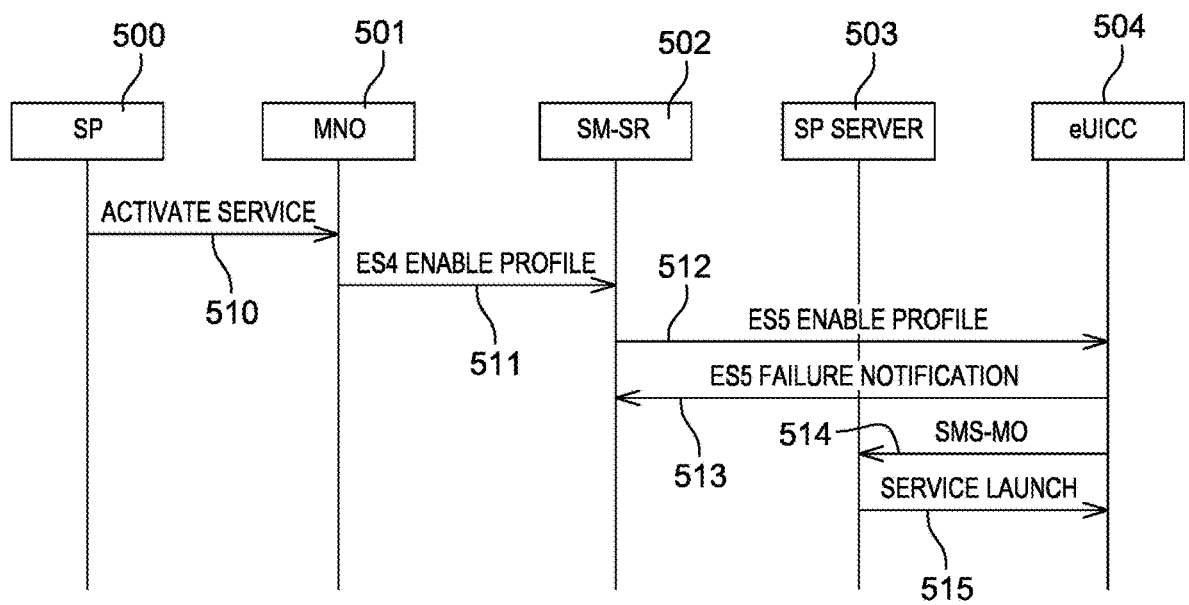
FIG. 5 is an example of sequence diagram allowing a service provider to launch a service of a eUICC whichever profile is activated.

FIG. 5 is an example of sequence diagram allowing a service provider to launch a service of a eUICC whichever profile is activated.

According to this example, several entities are involved. The service provider 500 and a server 503 operated by the service provider are represented. A mobile network operator 501, an SM-SR server 502 and the eUICC 504 implementing the service to be launched are also represented.

According to this example, a service provider 500 decided to launch a service provided by a given traversal application installed on a eUICC 504. This transversal application belongs to a transversal security domain which has been installed in the eUICC, for example during the manufacturing phase.

A transversal security domain can be generated by an SM-SR and identified using an application identifier AID. This AID can be an ISD-P-AID despite the fact that it is not referring to a profile, but to a transversal application.

An identifier of the service to be launched is transmitted by the service provided 500 to the mobile network operator 501 in the service activation request 510.

Then, the mobile network operator can initiate a profile enable procedure using ES4 interface. This procedure is designed for the MNO to request a Profile Enabling to the SM-SR in charge of the management of a targeted eUICC. According to this example, the profile enabling procedure is here used for a different purpose.

An ES4-EnableProfileRequest message is transmitted by the mobile network operator 501 to the SM-SR server 502. This request comprises an identifier EID of the eUICC 504 and an identifier which is generally used for identifying the profile called Integrated Circuit Card ID (ICCID).

Then, the SM-SR server 502 retrieves the ISD-P application identifier (ISD-P-AID) associated to the identifier, for example the ICCID, comprised in the ES4-EnableProfileRequest message and corresponding to the targeted traversal application.

The profile enabling procedure is then continued on the ES5 interface. For that purpose, the SM-SR server 508 sends an ES5 profile enabling command 512 to the eUICC 504. This command message 512 comprises the ISD-P-AID identifying the transversal security domain implementing the targeted transversal application.

The eUICC is configured to recognize the ISD-P-AID as the one associated to a transversal application. Therefore, the command request 512 is not interpreted by the eUICC as a request for activating a given subscription profile. Instead, it is interpreted as a request to inform the service provider associated to the target application of the MSISDN used by the subscription profile which is currently activated.

According to an example, once the ISD-P-AID is received by the eUICC 504 and interpreted as associated to a transversal security domain, a failure notification is transmitted 513 by the eUICC 504 to the SM-SR server 502 on the ES5 interface. This ES5 failure message 513 allows to terminate the ES5 profile enabling procedure and to inform the SM-SR server 502 that the activated subscription profile is unchanged. The advantage of sending this ES5 failure message is that potential SM-SR switch is avoided.

Then, the eUICC 504 sends a mobile originated short message SMS-MO 514 to the service provider server 503 controlling the target transversal application. This SMS-MO comprises a subscription address such as a MSISDN or an IMSI which is associated to the subscription profile which is currently activated.

At this stage, the service provider server 503 is aware of a valid subscription address corresponding to the profile activated in the eUICC 504. It is therefore able to launch a given service handled by the target transversal application. For that purpose, a communication channel can be established between the service provider server 503 and the eUICC 505 for the sever 515 to send a service launch command 515. This command message 515 comprises for example data needed by the transversal application to launch the service. If the service is a push notification, the content of the message to be displayed for the user of the IoT device embedding the eUICC 504 can be transmitted.

The invention claimed is:

1. A method for a service provider to launch a targeted service implemented by an application belonging to a security domain of an eUICC embedded into a communication device, said security domain and application being respectively called transversal security domain and transversal application, the eUICC comprising a set of at least one profile allowing the communication device to access to a specific mobile network infrastructure, one profile being activated at a time, the method comprising:
receiving, by the eUICC from an SM-SR server on a communication interface, a profile enable command for enabling a profile, said profile enable command comprising an identifier of the transversal security domain;
interpreting by the eUICC, in response to the profile enable command comprising the identifier of the transversal security domain, the profile enable command as a command for transmitting a subscription address associated to the active profile in the eUICC;
sending by the eUICC to a server operated by the service provider controlling the target traversal application an SMS message comprising a subscription address associated to the activated profile;
establishing a communication channel between the server operated by the service provider controlling the target traversal application and the eUICC, the establishment of the communication channel being initiated by the server operated by the service provider using the subscription address transmitted by the eUICC in the SMS;
receiving by the eUICC from the service provider controlling the target traversal application on said communication channel a command for launching the targeted service of the traversal application; and
launching by the eUICC the targeted service of the traversal application.

2. The method according to claim 1, comprising the step of sending an ES5 failure notification to the server operated by the service provider controlling the target traversal application after having interpreted the command for enabling a profile as a command for transmitting a subscription address associated to the activated profile.

3. The method according to claim 1, wherein the subscription address is a Mobile Station ISDN.

4. The method according to claim 1, wherein the subscription address is an International Mobile Subscriber Identity.

5. The method according to claim 1, wherein the subscription address is a SIP-URI.

6. An eUICC configured to be embedded in a communication device and comprising at least a security domain and an application belonging to this security domain, said security domain and application being respectively called transversal security domain and transversal application, the eUICC being further configured for a service provider to launch remotely a targeted service implemented by the transversal application, the eUICC comprising a set of at least one profile allowing the communication device to access to a specific mobile network infrastructure, one profile being activated at a time, the eUICC being further configured to:
receive from an SM-SR server on a communication interface a profile enable command for enabling a profile, said profile enable command comprising an identifier of the transversal security domain;
interpret, in response to the profile enable command comprising the identifier of the transversal security domain, the profile enable command as a command for transmitting a subscription address associated to the profile which is activated in the eUICC;
send to a server operated by the service provider controlling the target traversal application an SMS message comprising a subscription address associated to the activated profile;
establish a communication channel with the server operated by the service provider controlling the target traversal application, the establishment being initiated by the server operated by the service provider using the subscription address transmitted by SMS;
receive by the eUICC on said communication channel a command for launching the targeted service;
launch the targeted service.

7. The eUICC according to claim 6, further configured to send an ES5 failure notification to the server operated by the service provider controlling the target traversal application after having interpreted the command for enabling a profile as a command for transmitting a subscription address associated to the active profile in the eUICC.

8. The eUICC according to claim 6, wherein the subscription address is a Mobile Station ISDN (MSISDN).

9. The eUICC according to claim 6, wherein the subscription address is an International Mobile Subscriber Identity (IMSI).

10. The eUICC according to claim 6, wherein the subscription address is a SIP-URI.

11. A data processing system comprising means for carrying out the steps of a method for a service provider to launch a targeted service implemented by an application belonging to a security domain of an eUICC embedded into a communication device, said security domain and application being respectively called transversal security domain and transversal application, the eUICC comprising a set of at least one profile allowing the communication device to access to a specific mobile network infrastructure, one profile being activated at a time, the method having the steps:
receiving, by the eUICC from an SM-SR server on a communication interface, a profile enable command for enabling a profile, said profile enable command comprising an identifier of the transversal security domain;
interpreting by the eUICC, in response to the profile enable command comprising the identifier of the transversal security domain, the profile enable command as a command for transmitting a subscription address associated to the active profile in the eUICC;
sending by the eUICC to a server operated by the service provider controlling the target traversal application an SMS message comprising a subscription address associated to the activated profile;
establishing a communication channel between the server operated by the service provider controlling the target traversal application and the eUICC, the establishment of the communication channel being initiated by the server operated by the service provider using the subscription address transmitted by the eUICC in the SMS;

receiving by the eUICC from the service provider controlling the target traversal application on said communication channel a command for launching the targeted service of the traversal application; and launching by the eUICC the targeted service of the traversal application.

12. A non-transient computer-readable storage medium comprising instructions which, when executed by a computer, cause the computer to carry out the steps of the method for a service provider to launch a targeted service implemented by an application belonging to a security domain of an eUICC embedded into a communication device, said security domain and application being respectively called transversal security domain and transversal application, the eUICC comprising a set of at least one profile allowing the communication device to access to a specific mobile network infrastructure, one profile being activated at a time, the method comprising:

receiving, by the eUICC from an SM-SR server on a communication interface, a profile enable command for enabling a profile, said profile enable command comprising an identifier of the transversal security domain;

interpreting by the eUICC, in response to the profile enable command comprising the identifier of the transversal security domain, the profile enable command as a command for transmitting a subscription address associated to the active profile in the eUICC;

sending by the eUICC to a server operated by the service provider controlling the target traversal application an SMS message comprising a subscription address associated to the activated profile;

establishing a communication channel between the server operated by the service provider controlling the target traversal application and the eUICC, the establishment of the communication channel being initiated by the server operated by the service provider using the subscription address transmitted by the eUICC in the SMS;

receiving by the eUICC from the service provider controlling the target traversal application on said communication channel a command for launching the targeted service of the traversal application; and launching by the eUICC the targeted service of the traversal application.

13. The data processing system of claim 11, wherein the method further includes the step of sending an ES5 failure notification to the server operated by the service provider controlling the target traversal application after having interpreted the command for enabling a profile as a command for transmitting a subscription address associated to the activated profile.

14. The data processing system of claim 11, wherein the subscription address is a Mobile Station ISDN.

15. The data processing system of claim 11, wherein the subscription address is an International Mobile Subscriber Identity.

16. The data processing system of claim 11, wherein the subscription address is a SIP-URI.

17. The non-transient computer-readable storage medium of claim 12, wherein the method further includes the step of sending an ES5 failure notification to the server operated by the service provider controlling the target traversal application after having interpreted the command for enabling a profile as a command for transmitting a subscription address associated to the activated profile.

18. The non-transient computer-readable storage medium claim 12, wherein the subscription address is a Mobile Station ISDN.

19. The non-transient computer-readable storage medium claim 12, wherein the subscription address is an International Mobile Subscriber Identity.

20. The non-transient computer-readable storage medium claim 12, wherein the subscription address is a SIP-URI.

* * * * *